United States Patent
Gribschaw et al.

(10) Patent No.: US 8,163,171 B2
(45) Date of Patent: Apr. 24, 2012

(54) ULTRA PURE FLUIDS

(75) Inventors: Thomas Andrew Gribschaw, Friendswood, TX (US); Sylvain Hantzer, Purcellville, VA (US); Stephen John McCarthy, Center Valley, PA (US); Steven E. Silverberg, Seabrook, TX (US); Vijay Swarup, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1020 days.

(21) Appl. No.: 11/311,005

(22) Filed: Dec. 19, 2005

(65) Prior Publication Data

US 2006/0161031 A1 Jul. 20, 2006

Related U.S. Application Data

(60) Provisional application No. 60/644,178, filed on Jan. 14, 2005.

(51) Int. Cl.
*C10G 25/00* (2006.01)
*C10G 45/00* (2006.01)
*C07C 13/02* (2006.01)
*C07C 15/00* (2006.01)

(52) U.S. Cl. ........ 208/143; 208/144; 208/210; 208/213; 585/24; 585/266; 585/275

(58) Field of Classification Search ............ 585/24, 585/809, 266, 275; 208/210, 212, 213, 217, 208/143, 144
See application file for complete search history.

(56) References Cited

U.S. PATENT DOCUMENTS

| | | | |
|---|---|---|---|
| 4,567,315 A | 1/1986 | Owaysi et al. | 585/827 |
| 4,795,840 A | 1/1989 | Torii et al. | 585/16 |
| 5,151,172 A | 9/1992 | Kukes et al. | 208/144 |
| 5,220,099 A | 6/1993 | Schreiner et al. | 585/820 |
| 5,451,312 A | 9/1995 | Apelian et al. | |
| 5,593,569 A * | 1/1997 | Sherman | 208/108 |
| 5,612,422 A | 3/1997 | Hucul et al. | 525/338 |
| 5,830,345 A | 11/1998 | Lee et al. | 208/92 |
| 5,831,139 A | 11/1998 | Schmidt et al. | 585/315 |
| 5,853,566 A | 12/1998 | Kraushaar-Czarnetzki et al. | 208/109 |
| 5,855,767 A | 1/1999 | Powers et al. | 208/143 |
| 5,895,828 A * | 4/1999 | Yao et al. | 585/418 |
| 5,993,644 A | 11/1999 | Xiao et al. | 208/89 |
| 6,030,921 A | 2/2000 | Ziemer | 502/325 |
| 6,084,140 A | 7/2000 | Kitamura et al. | 585/260 |
| 6,136,181 A | 10/2000 | Ziemer | 208/144 |
| 6,197,721 B1 | 3/2001 | Didillon et al. | 502/236 |
| 6,207,870 B1 | 3/2001 | Kasztelan et al. | 585/269 |
| 6,264,826 B1 | 7/2001 | Xiao et al. | 208/18 |
| 6,281,397 B1 | 8/2001 | Santi et al. | 585/250 |
| 6,306,289 B1 | 10/2001 | Hayashi et al. | 208/264 |
| 6,417,281 B1 | 7/2002 | Garcia-Franco et al. | 525/240 |

(Continued)

FOREIGN PATENT DOCUMENTS

EP 0698 073 6/1994

(Continued)

*Primary Examiner* — Ellen McAvoy
*Assistant Examiner* — Latosha Hines
(74) *Attorney, Agent, or Firm* — Andrew B. Griffis

(57) ABSTRACT

The invention relates to hydrocarbon fluids having high purity with respect to at least one of sulfur species, nitrogen species, oxygenated species, and unsaturated species, particularly hydrocarbon fluids low in aromatics, a method of making said hydrocarbon fluids, a catalyst for use in said method, an apparatus whereby said method may be practiced, and uses of said fluids.

19 Claims, 4 Drawing Sheets

U.S. PATENT DOCUMENTS

| | | | |
|---|---|---|---|
| 6,432,297 B1 | 8/2002 | Kalnes et al. | 208/58 |
| 6,509,510 B1 | 1/2003 | Wege et al. | 585/266 |
| 6,541,417 B2 | 4/2003 | Kasztelan et al. | 502/325 |
| 6,579,444 B2 | 6/2003 | Feimer et al. | 208/243 |
| 6,723,229 B2 * | 4/2004 | Hantzer et al. | 208/210 |
| 2001/0013484 A1 | 8/2001 | Zeuthen et al. | 208/89 |
| 2002/0117425 A1 | 8/2002 | Knudsen et al. | 208/204 |
| 2003/0173252 A1 | 9/2003 | Vaarkamp | 208/111.35 |
| 2003/0188991 A1 | 10/2003 | Shan et al. | 208/113 |
| 2004/0024319 A1 | 2/2004 | Flipo | 600/459 |
| 2004/0181103 A1 | 9/2004 | Leliveld et al. | 585/269 |

FOREIGN PATENT DOCUMENTS

| | | | |
|---|---|---|---|
| WO | 94/26846 | | 11/1994 |
| WO | 01/14501 | | 3/2001 |
| WO | WO 01/14501 | * | 3/2001 |
| WO | WO 01/14501 A1 | * | 3/2001 |

* cited by examiner

ULTRA PURE FLUIDS

CROSS-REFERENCE TO RELATED APPLICATIONS

The present application claims the benefit of U.S. Provisional Application No. 60/644,178, filed Jan. 14, 2005, said application hereby fully incorporated by reference.

FIELD OF THE INVENTION

The invention relates to hydrocarbon fluids having high purity with respect to unsaturated species, particularly aromatics, a method of making said hydrocarbon fluids, a catalyst for use in said method, and uses of said fluids.

BACKGROUND OF THE INVENTION

Important properties of hydrocarbon fluids are the distillation information generally determined by ASTM D-86, ASTM D-1078, or the ASTM D-1160 vacuum distillation technique for heavier materials, flash point, density, Aniline Point as determined by ASTM D-611, aromatic content, as determined for example by UV spectroscopy, Bromine Index, as determined for example by ASTM D2710, viscosity, colour and refractive index. Fluids are classified as paraffinic such as the Norpar® fluids marketed by ExxonMobil chemical Company, isoparaffinic such as the Isopar® fluids marketed by ExxonMobil Chemical Company; dearomatized fluids such as the Exxsol D® fluids marketed by ExxonMobil Chemical Company; naphthenic materials such as the Nappar® fluids marketed by ExxonMobil Chemical Company; non-dearomatised materials such as the Varsol® fluids marketed by ExxonMobil Chemical Company and the aromatic fluids such as the Solvesso™ heavy aromatic fluids marketed by ExxonMobil Chemical Company.

As with any hydrocarbon product whose starting point is crude oil, the degree of purity which may be achieved in a hydrocarbon fluid grade or "cut" covers a wide range from relatively crude to relatively pure. Typically, industrial-scale production of hydrocarbon fluids results in a product having a boiling range generally covering at least about 5° C. (e.g., hexane) and extended up to close to 100° C. (e.g, kerosene). As used herein, the term "boiling range" means the temperature spread between the initial temperature at which the specified cut boils and the dry point temperature.

The chemical nature and composition of hydrocarbon fluids varies considerably according to the use to which the fluid is to be put. Although each grade of hydrocarbon fluid has commercial use, there are special applications which require hydrocarbon fluids of exceptional purity with respect to aromatics and/or heteroatoms, particularly sulfur and oxygen-containing species, but not ultra-high purity with respect to isomers and/or carbon number of the hydrocarbons themselves. For instance, in the case of hexane produced and consumed on an industrial-scale, it may typically be sold in a grade which begins boiling at about 64° C. or 65° C. and finishes boiling at about 70° C., and which contains a wide variety of hydrocarbons in addition to n-hexane. This type of grade is effective for many processes, e.g., as a processing aid in the manufacture of polymers, as a solvent in a solvent extraction process, and the like (as opposed to ultra-high purity spectroscopic-grade n-hexane available on a relatively small laboratory-scale quantities from, for instance, Aldrich Chemicals, which may contain 95% or higher n-hexane).

Currently available dearomatized fluids having a distillation cut of from 50° C. to 350° C. are available on industrial scale through fractionation of kerosene, diesel or other petroleum cuts, followed by one or several hydrogenation processes using hydrogenation catalysts, typically, nickel or nickel-based catalysts. As used herein, the term "distillation cut" means that the material identified has an initial boiling point greater than or equal to the lower temperature (e.g., here 50° C.) specified and a dry point less than or equal to the higher temperature specified (e.g., here 350° C.). As used herein, the term "actual cut" when applied to a temperature range identifies exactly the initial boiling and dry point of the material identified. Thus, using the previous hexane example, there is a hexane grade which may be described as an actual cut from 64° C. to 70° C. within the distillation cut of 50-350° C. and having a boiling range of 6° C.

The levels of aromatics achieved by the aforementioned fractionation and/or hydrogenation methods vary depending on the feed that is hydrogenated, the higher boiling hydrocarbons being much more difficult to dearomatize than the lower boiling range hydrocarbons. Typically, aromatic levels of from 100 ppm to 8000 ppm can be achieved by these methods, for hydrocarbon fluids having a distillation cut of from 150° C. to 300° C., and a boiling range of less than 40° C. Lower aromatic levels may be achieved for compositions having an initial boiling point below 150° C., but for such low boiling hydrocarbons, it would be desireable for certain applications to reduce further the level of heteroatom-containing molecules. There is thus a need to find methods for the preparation of hydrocarbon fluids having amounts of aromatics and/or amounts of heteroatom-containing molecules, such as sulfur-containing and oxygen-containing molecules, that are lower than those achievable by the present industrial scale dearomatization methods.

Dearomatized hydrocarbon fluids, such as those based on kerosene, diesel, or other refinery feeds, are used in a variety of end uses including inks, consumer products, metal rolling, water treatment, coatings, drilling muds, agricultural formulations, and the like. Historically, dearomatized fluids contained about 1-2 wt. % aromatic and other unsaturated species (e.g., olefins). By way of example, a petroleum feed may be hydrogenated over a catalyst such as nickel, Ni/Mo, Ni/Mo/W to provide an intermediate product having, for instance, 20 wt. % aromatics, followed by a finishing step, which comprises hydrogenation over a catalyst such as nickel. This level of aromatics is unsatisfactory for end uses such as water treatment. In addition to levels of aromatics and olefinic species on the order of 1-2 wt. %, other typical impurities in the final product include high levels of heteroatoms such as sulfur compounds, nitrogen compounds, and oxygenates. These other impurites are detrimental when dearomatized hydrocarbon fluids are used, for instance, as solvents in catalytic processes or in processes requiring an ultra low level of such impurities, such as in semiconductor processing. The use of Ni in hydrogenation reactors is also a safety concern because of the danger of runaway reactions.

High pressure hydrogenation methods can achieve aromatic levels on the order of 100-500 ppm. However, the investment in such methods is quite high, and create increased safety concerns. Furthermore, presently available hydrogenation methods typically do not decrease oxygenate content in the final product, which is a drawback for many reasons, such as increased catalyst deactivation in processes using the hydrocarbon fluid as process fluid.

Accordingly, a method of producing ultra low levels of aromatics, oxygenates, and other impurities in hydrocarbon fluids without such high pressure methods is highly sought after. In addition, aromatic content even lower than 100 ppm is desired because of increased environmental concerns and increased regulatory requirements concerning aromatic content in hydrocarbon fluids used in consumer products, water treatment methods, and the like.

The prior art has not provided a solution to all these problems in an economical manner and/or environmentally sound manner.

Numerous patents teach dearomatization by adsorption, such as U.S. Pat. Nos. 4,567,315 and 5,220,099, but adsorption processes are both environmentally unsound and energy inefficient solutions.

U.S. Pat. No. 4,795,840 is an example of a hydrogenation process using a pressure on the order of 30-100 kg/cm$^2$ (about 30-100 atm). The product, however, retains at least 1 wt. % of alkyl tetralins, an aromatic species. Subsequent to hydrogenation, a separation using molecular sieves is applied.

U.S. Pat. No. 5,151,172 teach hydrogenating a hydrocarbon feedstream using a catalyst comprising Pt/Pd on mordenite achieving, according to examples presented, as low as 16 wt. % aromatics content.

U.S. Pat. No. 5,830,345 teaches a gasoline blend made by a reaction involving simultaneous hydrogenation and isomerization of a benzene-enriched reformate stream using a dual catalyst comprising an hydrogenation catalyst and a zeolite catalyst having pores of about 5 Å.

U.S. Pat. No. 5,831,139 teach selectively upgrading naphtha to a more aliphatic gasoline having low aromatics by a process comprising selective isoparaffin synthesis from heavy naphtha and a recycle stream which is subject to ring cleavage, the overall effect being that the molecular weight and boiling point of the hydrocarbons are reduced.

U.S. Pat. No. 5,855,767 teach a high pressure ($\geqq$30 bar) hydrocarbon conversion process comprising contacting a cracking catalyst including a zeolite-beta as a first component, a second component which may be MCM-41, and a hydrogenation component.

U.S. Pat. No. 5,855,767 teach a process for saturation of lube range hydrocarbons using a nobel metal on zeolite inorganic oxide support under conditions of a temperature range of 350-700° F., 150-3500 psig using a feed having a viscosity of 50-600 SUS at 100° F. Aromatic content is reduced to as low at 3 vol. % according to patentee.

U.S. Pat. No. 5,993,644 teaches a process for producing a lubricating oil basestock comprising steps of hydrotreating, dewaxing, and hydrogenation. According to the examples, the process can achieve aromatic content as low as about 6 wt. %; similar results for aromatic levels are shown in U.S. Pat. No. 6,399,845, which teaches the manufacture of diesel fuel from middle distillate with a catalyst that both removes aromatics and isomerizes paraffins.

U.S. Pat. No. 6,030,921 teach hydrogenation of lubricating oil stocks in a process involving hydrocracking and hydrogenation. The examples in the patent show conversion of aromatics of about 86%.

U.S. Pat. No. 6,207,870 and U.S. Pat. No. 6,541,417 teach hydrogenating aromatics in gas oil cut at pressures of about 6 MPa using a silicon-doped catalyst.

U.S. Pat. No. 6,306,289 teach a method of hydrotreating a hydrocarbon oil using a catalyst comprising a Group VIII metal and "a large amount" of silica. Examples show that at 60 kg/cm$^2$ sulfur content may be reduced to about 500 ppm. Results for aromatics levels are not provided.

U.S. Pat. No. 6,509,510 concerns a process for hydrogenating an aromatic polymer using a silica- or alumina-supported Group VIII catalyst having a pore size of at least 100 Å.

U.S. Pat. No. 6,541,417 utilizes a silicon-doped Group VIII catalyst for hydrogenation of hydrocarbon feeds, particularly dearomatization of gas oil cuts.

U.S. 2001/0013484 and 2002/0117425 are directed to achieving low polyaromatic hydrocarbons (PAH). Examples show reduction of PAH to an amount of above 9 wt. %.

U.S. 2003/0188991 teaches a mesoporous silica catalyst capable of hydrogenation, isomerization, hydrocracking and numerous other reactions. Pd on MCM-41 is used for comparison purposes (see, e.g., Table 15 of the patent).

U.S. 2004/0181103 teaches a supported catalyst useful in dearomatizing fuels. According to the examples, aromatic levels as low as 480 ppm are achieved.

WO 01/14501 discuses reducing the concentration of aromatics and/or olefins in a diesel fuel using a catalyst comprising Pt/Pd on MCM-41, with "complete aromatics saturation" at temperatures greater than 450° F. (about 232° C.)

WO 2004/024319 teaches a catalyst for selectively upgrading paraffinic feedstock to isoparaffin products useful for blending with gasoline.

EP 0 698 073 relates to a process for the hydrogenation of aromatics in hydrocarbonaceous feedstocks, the examples showing a reduction in aromatics content to just below about 1 wt. %.

Other patents of interest include U.S. Pat. Nos. 5,612,422; 5,853,566; 6,084,140; 6,136,181; 6,197,721; 6,264,826; 6,280,608; 6,281,397; 6,417,287; 6,432,297; 6,579,444; and 2003/0173252.

The present inventors have surprisingly discovered a method of hydrogenating hydrocarbon fluids that does not require the use of high pressure systems and provides for ultra low levels of impurities, particularly aromatics and other unsaturates.

SUMMARY OF THE INVENTION

The invention is directed to hydrocarbon fluids having low levels of unsaturated species, particularly aromatics and olefinic species, and in embodiments also provides hydrocarbon fluids having low levels of sulfur and or oxygenated species. The invention is also directed to a method of hydrogenation and/or hydrodesulfurization that provides for such hydrocarbon fluids, and a catalyst that is useful in said method. Uses of the ultra high purity hydrocarbon fluids are also contemplated as embodiments of the present invention.

In an embodiment, the hydrocarbon fluids contain less than 500 ppm aromatic species and in a preferred embodiment less than 100 ppm aromatic species, and even lower amounts in more preferred embodiments specified herein. In still even more preferred embodiments of the aforementioned embodiments, the low levels of aromatics are accompanied by low levels of oxygenates and/or sulfur species.

In an embodiment, the boiling range of the distillate according to the present invention is the same as the boiling range of the feedstock. In another embodiment the feedstock is not isomerized and/or cracked by the process according to the present invention.

In an embodiment, the method of hydrogenation according to the invention comprises a step of dearomatizing a hydrocarbon fluid using a catalyst according to the invention, said catalyst comprising a supported Group VIII metal, preferably selected from palladium, platinum, rhodium, iridium, and mixtures thereof, and optionally comprising a binder As used herein, the term "Group VIII" utilizes the traditional CAS nomenclature for the Periodic Table; see Chemical and Engineering News, 63(5), 27, 1985. In preferred embodiments, the catalyst is not doped with silicon.

In another preferred embodiment, the method of hydrogenation comprises a first step of hydrotreating and/or hydrofining, preferably including dearomatizing a hydrocarbon fluid using a first catalyst and a second step of dearomatizing said hydrocarbon fluid using a catalyst according to the present invention, wherein said first step comprises use of a prior art catalyst to reduce the amount of impurities selected from olefinic unsaturation, aromatics, sulfur, and mixtures thereof, the catalyst preferably selected from hydrogenation catalysts known in the prior art, as set forth in the Background, such as a catalyst comprising nickel. In yet another preferred embodiment, said first step provides a hydrocarbon fluid having at least about 500 ppm and in embodiments from about 1 wt. % to about 20 wt. % aromatic species, and said second step provides a hydrocarbon fluid having less than 500 ppm and more preferably less than 100 ppm aromatic species, and still more preferably less then 50 ppm, and yet still more preferably less than 20 ppm, and yet again more preferably less than 10 ppm, of aromatic species. As used throughout this disclosure, ppm is based on weight of the entire fluid, unless otherwise specified. In still yet again more preferred embodiments, the low levels of aromatics are accompanied by low levels of oxygenates and/or sulfur species.

In another embodiment, a method according to the invention is a method comprising hydrogenation and/or hydrodesulfurization which provides for desulfurized hydrocarbon fluids containing less than about 0.1 ppm sulfur (based on atomic sulfur).

In still another embodiment, a method according to the invention is a method comprising hydrogenation and/or hydrodesulfurization which provides for hydrocarbon fluids having less than 10 ppm oxygenated species, in another embodiment less than 5 ppm, in another embodiment less than 1 ppm, and in another embodiment there are no detectable oxygenated species by FID.

In yet another embodiment, a catalyst is provided for hydrogenation and/or hydrodesulfurization of hydrocarbon fluids, said catalyst comprising a mesoporous MCM-41 comprising about 0.10-0.25 wt. % Pt and about 0.30-0.75 wt. % Pd, having a binder comprising alumina.

It is an object of the invention to provide hydrocarbon fluids having low amounts of aromatics and other unsaturated impurities without the use of high pressures, and/or having low amounts of oxygenates, and/or low amounts of sulfur, and/or low amounts of nitrogen species, or any combination thereof.

It is another object of the invention to provide hydrocarbon fluids having ultra low aromatics particularly for use in consumer products such as paints, cleaning products, industrial processes requiring ultra high purity solvents such as the semiconductor industry, and processes requiring high levels of purity, such as water treatment processes and solvent extraction processes, and other process such as drilling fluid compositions and ore extraction compositions.

These and other embodiments, objects, features, and advantages will become apparent as reference is made to the following drawings, detailed description, examples, and appended claims.

BRIEF DESCRIPTION OF THE DRAWINGS

In the accompanying drawings, like reference numerals are used to denote like parts throughout the several views.

DETAILED DESCRIPTION

Figure 1:
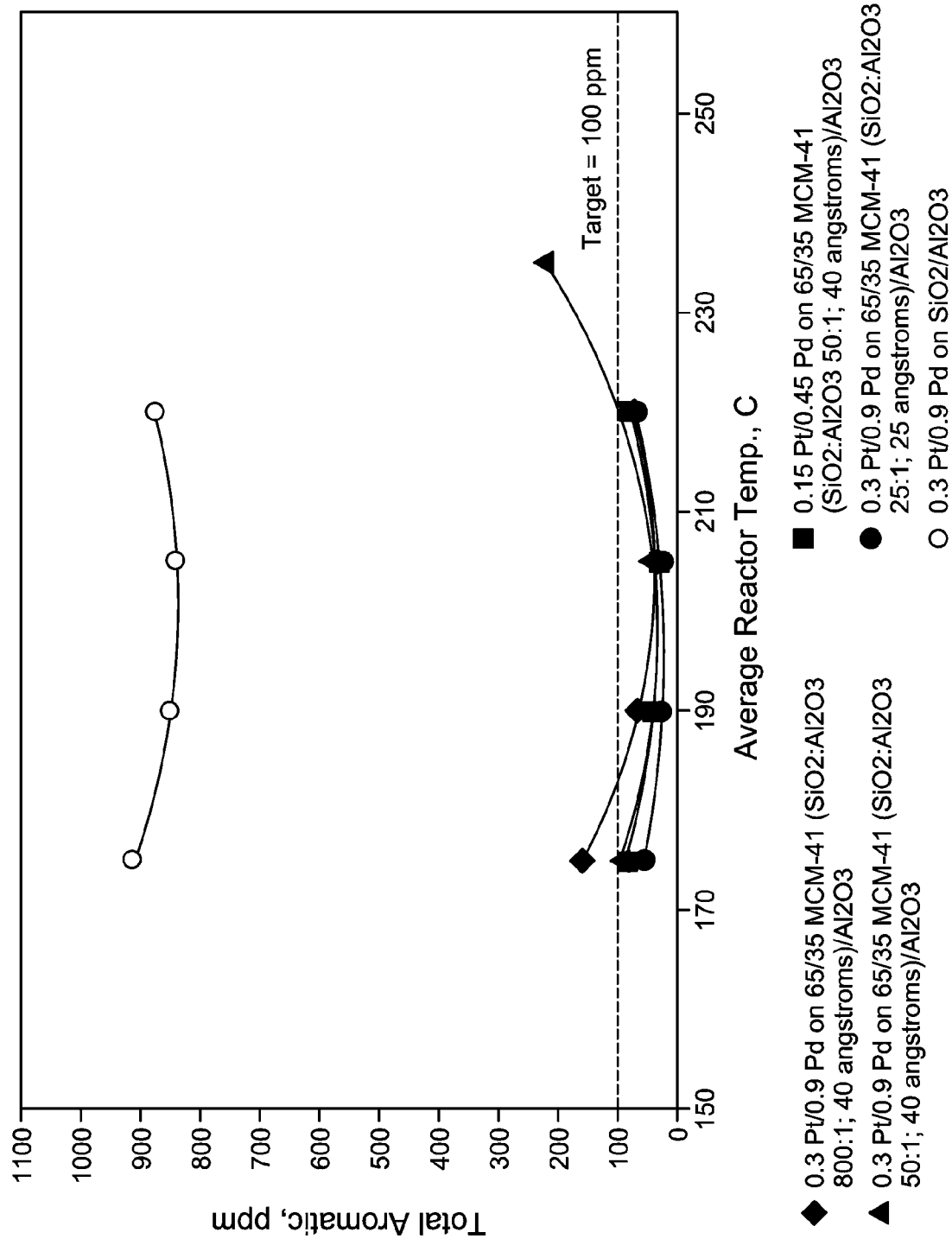
FIG. 1 illustrates aromatic levels achieved for hydrogenation of a hydrocarbon fluid feedstock for an embodiment of the present invention, in comparison with a prior art process.

According to the invention, a feedstream comprising hydrocarbon fluids and further comprising impurities selected from aromatics, olefinic species, oxygen-containing compounds, sulfur compounds, and mixtures thereof, is contacted with an aromatics saturation catalyst selected from Group VIII metals in the presence of a hydrogen-containing treat gas in a reactor to provide a hydrocarbon fluid product low in aromatics.

The feedstream useful in the present invention comprises hydrocarbon fluids. Typically the feedstream will be selected cuts from crude oil, e.g., ACN (Atmospheric Crude Naptha), HVN (Heavy Virgin Naptha), kerosene, diesel, LGO (LIght Gas Oils), PGO (Process Gas Oils), and mixtures thereof. Feedstreams may also be from a chemicals process.

In an embodiment, the feedstream may comprise oligomers from either a refinery or chemical process used to produce paraffins, isoparaffins olefins, isoolefins, and mixtures thereof. Yet even more specifically, in another preferred embodiment, the feedstream may be alkylates that have been oligomerized from a refinery stream derived from PGO, a feedstream comprising an aromatics extraction unit raffinate primarily containing isoparaffinic material, a feedstream derived from a gas-to-liquids (GTL) process, which may also comprise principally isoparaffinic material. In still another preferred embodiment the feedsteams comprise one of the aforementioned cuts or a feedstream which has been previously hydrofined to remove sulfur to a level on the order of about 10 ppm, using, e.g., a Ni/Mo, Co/Mo catalyst. (Sulfur content referred to herein will be according to ASTM D5453 (Antek equipment) unless otherwise specified. Sulfur content may also be determined by ASTM D4045 (Houston Atlas equipment)).

Hydrotreating and hydrofining per se are well-known terms in the art. Also, throughout the specification, weight percentages and weight ppms are expressed with respect of the total weight of the composition, unless otherwise specified.

As used herein, the term "fluid" means materials that may function as one or more of a carrier, a diluent, a surface tension modifier, dispersant, and the like, as well as a material functioning as a solvent, in the traditional sense of a liquid which solvates a substance (e.g., a solute), and the term "hydrocarbon fluid" additionally means a material consisting of hydrogen and carbon atoms which is liquid at ambient temperature and pressure (25° C., 1 atm).

In an embodiment the hydrocarbon fluid comprises at least one C5-C19 hydrocarbon fluid, which may be straight-chained, branched, cyclic, polycyclic, or acyclic, or a mixture of such hydrocarbons.

In an embodiment, the hydrocarbon fluid product has essentially the same boiling range as the hydrocarbon fluid in the feedstream, i.e., the hydrogenation process according to the present invention does not involve cracking. In another embodiment, the feedstream may be prefractionated and/or postfractionated into narrower cuts.

In another embodiment, the hydrocarbon fluid in the product has not been isomerized during the process according to the present invention. By this is meant that isomerization products cannot be detected by GC methods using GC instruments capable of detection at 0.1 wt. %. Such instrumentation and the methods to make such a determination are commonly available to one of ordinary skill in the art.

In preferred embodiment the hydrocarbon fluid product has the same boiling range as the hydrocarbon fluid feedstream and has not been isomerized.

The present invention relates more particularly to a method of making dearomatized fluids that are blends of aliphatic hydrocarbons of various kinds having from 5 to 25 carbon atoms (C5-C25), preferably from 5 to 23 carbon atoms, with additional contemplated embodiments including C5-C9, C5-C8, C6-C8, C9-C19, in addition to other embodiments set forth herein, which may be linear, branched, acyclic, cyclic and/or polycyclic molecules, depending on the particular grade of interest. As used herein, a hydrocarbon fluid having a specified carbon range Cx to Cy or Cx-Cy means a hydrocarbon fluid comprising at least one carbon number within the range of x to y, inclusive of x and y. Typically, the dearomatized hydrocarbon fluids will be a distillation cut from about 50° C. and 380° C., preferably ranging from 60° C. to about 350° C. In another embodiment, the dearomatized fluids will be a distillation cut ranging from about 60 to 150° C. and having from 5 to 10 carbon atoms, preferably from 6 to 8 carbon atoms. In another embodiment, the dearomatized hydrocarbon fluids will a distillation cut ranging from about 300 to 600° F. (about 150-315° C.) and having from 9 to 19 carbon atoms, or ranging from 356 to 600° F. (about 180-350° C.) and having from 10 to 19 carbon atoms. Typically the dearomatized fluids will have a boiling range of at least 5° C. and as high as less than 100° C., with a preferred boiling range being from about 5° C. to about 40° C. Additional embodiments include hexane and heptane-boiling range hydrocarbon fluids specified in more detail below.

It will be recognized by one of ordinary skill in the art in possession of the present invention that the various embodiments set forth herein may be combined in many different ways to arrive at addition embodiments which are also part of the present invention. For instance, a process according to the invention may comprise fractionating a refinery stream to obtain a C5-C19 hydrocarbon cut, hydrofining and then hydrogenating said cut to obtain a C5-C19 mixed hydrocarbon fluid having an aromatics content of, in an embodiment, about 1-20 wt. % and a sulfur content of about 1 ppm, and then contacting said hydrocarbon fluid with a catalyst according to the present invention in a fixed bed reactor to obtain a C5-C19 hydrocarbon fluid having an aromatics content of <500 ppm, a sulfur content of less than about 0.1 ppm, and a boiling range the same as the fluid prior to contacting said catalyst according to the present invention in said fixed bed reactor, postfractionating said C5-C19 hydrocarbon fluid to obtain a cut having an actual cut from 64 to 70° C. or 65 to 70° C. (a boiling range of 6° C. or 5° C., respectively) and principally comprising hexane, having an aromatics content of less than 10 ppm, and very low to no detectable sulfur or oxygen species.

The aforementioned detailed embodiment, which combines numerous embodiments previously recited, may optionally further include at least one of the privisos that no products attributable to cracking and/or no products attributable to isomerization of the feedstream entering the reactor are detectable. Products attributable to cracking are determined on the same basis as products attributable to isomerization, as explained above.

By the term "principally comprising" is meant that the species identified is present in an amount greater than any other species. In the case of the aforementioned example, the actual cut from 64-70° C. and principally comprising hexane may have from about 30-99 wt. % hexane or "C6", or 35-90 wt. % hexane, or 35-65 wt. % hexane, or 60-90 wt. % hexane, or 60-85 wt. % hexane, with embodiments contemplated from any lower wt. % limit to any upper wt. % limit set forth in this paragraph. In a preferred embodiment, the actual cut of 64-70° C. (or 65 to 70° C.) may have, in a preferred embodiment, low levels of oxygenates in the amount of less than 1 ppm, or in a more preferred embodiment no detectable oxygenates by FID, as described in more detail below.

Similarly, other C5-C19 hydrocarbon fluid cuts from refinery or chemical plant operations may be obtained, having a lower level of impurities with respect to the feedstream in terms of at least one of aromatics, unsaturates, sulfur, and oxygenates, which levels, prior to the present invention, were not known to be obtainable, at least not without high pressure methods.

For instance, an important product that may be obtained by way of the present invention is a heptane grade, which may be described as an actual cut of from about 90-100° C., 91-100° C., 92-100° C., or 93-100° C., and having, in an embodiment, no detectable sulfur species by ASTM D-5453, an aromatics content of <7 ppm, and oxygenates measured at less than 1 ppm by FID. The term "heptane grade" as used herein means composition comprising principally C7 hydrocarbons, and including mixtures of isomers of C7 hydrocarbons.

The term "aromatics" as used herein means species possessing aromaticity, which in turn means a ring structure having the presence of a closed loop of electrons, which may be most easily determined by NMR. The definition used herein is intended to be consistent with that set forth in March, *Advanced Organic Chemistry* (1992), e.g., pp. 40-41. Typical aromatics found in feedstocks useful in the present invention include benzene, naphthalenes, tetralins, and the like.

The method according to the invention comprises contacting a feedstream comprising hydrocarbon fluids and further comprising, in an embodiment, unsaturates present in the amount of at least 0.5 wt. %, and in another embodiment at least 1 wt. %, and in an embodiment no more than 20 wt. %, with an aromatics saturation catalyst in the presence of a hydrogen-containing treat gas in a reaction stage preferably operated under effective aromatics saturation conditions, wherein said aromatics saturation catalyst comprising a hydrogenation component selected from the Group VIII metals and mixtures thereof, supported on an inorganic, porous, non-layered, crystalline, mesoporous support material, wherein the support material has a framework comprising at least aluminum and silica, and wherein the ratio of silica to aluminum is about 10:1 to about 100:1 and the average pore diameter of the support material is about 15 to less than about 100 Å. It should be understood that the present invention contemplates a feedstream comprising hydrocarbon fluids which may have greater than 20 wt. % unsaturates, however it is preferred that the feed comprising less than 30 wt. % unsaturates, even more preferably less than 25 wt. % unsaturates.

Feedstreams suitable for use in the present invention include any conventional feedstreams used in hydrocarbon fluids processing, including kerosene, diesel, or other refinery or chemical operations feedstreams, as discussed in detail above. In an embodiment, such suitable feedstreams further comprise impurities selected from sulfur contaminants. Oxygenates may also be present in such feedstreams, however typically of concern are oxygenates that may be an artifact (without wishing to be bound by theory) of feed preparation processes, prior art hydrogenation processes and/or the catalysts used therein; the present invention, in an embodiment, results in a reduction of such oxygenates. Products according to the present invention are low in oxygenates typically found in products produced by prior art hydrogenation processes, e.g., alcohols, as previously mentioned.

The catalyst according to the invention includes a hydrogenation component, a support component, and optionally a binder component, all of which are described in more detail herein.

The framework of the support material comprises at least aluminum and silica, and the support material is further characterized as having an average pore diameter of about 15 to less than about 100 Å. In embodiments, the pore size may be from 15 to about 60 Å, or 15 to about 50 Å, or 25 to about 60 Å, or 25 to about 50 Å, or 30 to about 50 Å, or 35 to about 55 Å, or about 15 to about 35 Å. The catalyst also comprises a hydrogenation component selected from the Group VIII metals and mixtures thereof, preferably selected from Pt and Pd, more preferably a combination of Pt and Pd.

In their calcined form, support materials having characteristics similar to those suitable for use herein generally had a high ratio of silica to aluminum in their framework. Generally, these materials had a ratio of silica to aluminum in their framework on the order of about 800:1. The higher ratios of silica to aluminum were used to prevent undesirable cracking reactions. However, increasing the amount of aluminum incorporated into the framework, coupled with smaller pore sizes discussed below, provides a catalyst that has improved aromatics saturation capabilities for use in providing hydrocarbon fluids having ultra low aromatics.

Thus, support materials suitable for use in the in the present invention include synthetic compositions of matter comprising an ultra-large pore size crystalline phase. The catalyst may further be described by one or more of the following characteristics. Suitable support materials are inorganic, porous, non-layered crystalline phase materials that are characterized (in its calcined form) by an X-ray diffraction pattern with at least one peak at a d-spacing greater than about 18 Å with a relative intensity of 100. The support materials suitable for use herein are also characterized as having a benzene sorption capacity greater than 15 grams of benzene per 100 grams of the material at 50 torr and 25° C.

Preferred support materials are inorganic, porous, non-layered material having a hexagonal arrangement of uniformly-sized pores with a maximum perpendicular cross-section pore dimension of about 15 to less than about 100 Å. A more preferred support material is identified as MCM-41. MCM-41 has a characteristic structure of hexagonally-arranged, uniformly-sized pores of at least 13 Å diameter, exhibits a hexagonal electron diffraction pattern that can be indexed with a $d_{100}$ value greater than 18 Å, which corresponds to at least one peak in the X-ray diffraction pattern. MCM-41 and/or metal loadings thereon are described in U.S. Pat. Nos. 5,098,684; 5,102,643; 5,264,641; 5,451,312; and 5,573,657.

In an embodiment, the inorganic, non-layered mesoporous crystalline support materials used as components in the present invention have a composition which may be described broadly by the formula $M_{n/q}(W_a X_b Y_c Z_d O_h)$. In this formula, W is a divalent element, selected from divalent first row transition metal, preferably manganese, cobalt, iron, and/or magnesium, more preferably cobalt. X is a trivalent element, preferably aluminum, boron, iron and/or gallium, more preferably aluminum. Y is a tetravalent element such as silicon and/or germanium, preferably silicon. Z is a pentavalent element, such as phosphorus. M is one or more ions, such as, for example, ammonium, Group IA, IIA and VIIB ions, usually hydrogen, sodium and/or fluoride ions. "n" is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1. In a preferred embodiment of support materials suitable for use herein, (a+b+c) is greater than d, and h=2. Another further embodiment is when a and d=0, and h=2. Preferred materials for use in making the support materials suitable for use herein are the aluminosilicates although other metallosilicates may also be used. According to an embodiment of the present invention, in the aforementioned formula X is aluminum (Al), Y is silicon (Si) and subscripts a and d are both zero.

As stated above, the support materials suitable for use herein preferably have a higher concentration of aluminum incorporated into their framework. Thus, support materials suitable for use herein have a framework silica to aluminum ratio of about 10:1 to about 850:1, or in an embodiment about 10:1 to about 800:1, or 10:1 to 400:1, or 10:1 to 200:1, or 20:1 to 400:1, or 20:1 to 200:1, or 30:1 to 200:1.

In the as-synthesized form, the support materials suitable for use herein have a composition, on an anhydrous basis, expressed empirically by the formula $rRM_{n/q} (W_a X_b Y_c Z_d O_h)$, where R is the total organic material not included in M as an ion, and r is the coefficient for R, i.e. the number of moles or mole fraction of R. The M and R components are associated with the material as a result of their presence during crystallization, and are easily removed or, in the case of M, replaced by post-crystallization methods described below. To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g. ammonium, ions and mixtures of these ions. Particularly preferred ions are those which provide the desired metal functionality in the final catalyst. These include hydrogen, rare earth metals and metals of Groups VIIA (e.g. Mn), VIIIA (e.g. Ni), IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous support materials are characterized by their structure, which includes extremely large pore windows as well as by its high sorption capacity. The term "mesoporous", as used herein, is meant to indicate crystals having uniform pores within the range of from about 13 Å to about 200 Å. It should be noted that "porous", as used herein, is meant to refer to a material that adsorbs at least 1 gram of a small molecule, such as Ar, $N_2$, n-hexane or cyclohexane, per 100 grams of the porous material. As stated above, the present invention is characterized as using a support material having an average pore diameter of about 15 to less than about 100 Å, with additional embodiment set forth above.

The support materials suitable for use herein can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. Thus, support materials for use herein can also be described as having a hexagonal arrangement of large open channels that can be synthesized with open internal diameters from about 15 to less than about 100 Å.

The term "hexagonal", as used herein, is intended to encompass not only materials that exhibit mathematically perfect hexagonal symmetry within the limits of experimental measurement, but also those with significant observable deviations from that ideal state. Thus, "hexagonal" as used to describe the support materials suitable for use herein is meant to refer to the fact that most channels in the material would be surrounded by six nearest neighbor channels at roughly the same distance. It should be noted, however, that defects and imperfections in the support material will cause significant numbers of channels to violate this criterion to varying degrees, depending on the quality of the material's preparation. Samples which exhibit as much as ±25% random deviation from the average repeat distance between adjacent channels still clearly give recognizable images of the MCM-41 materials. Comparable variations are also observed in the $d_{100}$ values from the electron diffraction patterns.

The support materials suitable for use herein can be prepared by any means known in the art, and are generally formed by the methods described in the prior art set forth herein, such as the United States patents discussed above (e.g., U.S. Pat. Nos. 5,098,684 and 5,573,657). Generally, the most regular preparations of the support material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of suitable support materials show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance a.sub.0 between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the suitable support material. The most highly ordered preparations of the suitable support material obtained so far have 20-40 distinct spots observable in the electron diffraction patterns. These patterns can be indexed with the hexagonal hk0 subset of unique reflections of 100, 110, 200, 210, etc., and their symmetry-related reflections.

In its calcined form, support materials suitable for use herein may also be characterized by an X-ray diffraction pattern with at least one peak at a position greater than about 18 Å d-spacing (4.909° 2θ for Cu K-alpha radiation) which corresponds to the $d_{100}$ value of the electron diffraction pattern of the support material. Also, as stated above, suitable support materials display an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

It should be noted that the equilibrium benzene adsorption capacity characteristic of suitable support materials is measured on the basis of no pore blockage by incidental contaminants. For example, the sorption test will be conducted on the crystalline material phase having no pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal.

In a more preferred embodiment, the calcined, crystalline, non-layered support materials suitable for use herein can be characterized by an X-ray diffraction pattern with at least two peaks at positions greater than about 10 Å d-spacing (8.842° 2θ for Cu K-alpha radiation) which corresponds to the $d_{100}$ value of the electron diffraction pattern of the support material, at least one of which is at a position greater than about 18 Å d-spacing, and no peaks at positions less than about 10 Å d-spacing with relative intensity greater than about 20% of the strongest peak. Still most preferred, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined, inorganic, non-layered, crystalline support materials suitable for use herein can also be characterized as having a pore size of about 15 to less than about 40 Å or greater as measured by physisorption measurements. It should be noted that pore size, as used herein, is to be considered a maximum perpendicular cross-section pore dimension of the crystal.

As stated above, the support materials suitable for use herein can be prepared by any means known in the art, and are generally formed by the methods described in U.S. Pat. Nos. 5,098,684 and 5,573,657. The methods of measuring x-ray diffraction data, equilibrium benzene absorption, and converting materials from ammonium to hydrogen form is known in the art and can also be reviewed in U.S. Pat. No. 5,573,657.

The support materials suitable for use herein can be shaped into a wide variety of particle sizes. Generally speaking, the support material particles can be in the form of a powder, a granule, or a molded product, such as an extrudate having particle size sufficient to pass through a 2 mesh (Tyler) screen and be retained on a 400 mesh (Tyler) screen. In cases where the final catalyst is to be molded, such as by extrusion, the support material particles can be extruded before drying or partially dried and then extruded.

The size of the pores in the present support materials are controlled such that they are large enough that the spatiospecific selectivity with respect to transition state species in reactions such as cracking is minimized (Chen et al., "Shape Selective Catalysis in Industrial Applications", 36 CHEMICAL INDUSTRIES, pgs. 41-61 (1989) to which reference is made for a discussion of the factors affecting shape selectivity). It should also be noted that diffusional limitations are also minimized as a result of the very large pores.

Support materials suitable for use herein can be self-bound, i.e. binderless. However, it is preferred that the present invention also comprises a suitable binder material. This binder material is selected from any binder material known that is resistant to temperatures and other conditions employed in processes using the present invention. The support materials are composited with the binder material to form a finished catalyst onto which metals can be added. Binder materials suitable for use herein include active and inactive materials and synthetic or naturally occurring zeolites as well as inorganic materials such as clays and/or oxides such as alumina, silica or silica-alumina. Silica-alumina, alumina and zeolites are preferred binder materials, and alumina is a more binder support material. Silica-alumina may be either naturally occurring or in the form of gelatinous precipitates or gels including mixtures of silica and metal oxides. Inactive materials may be incorporated into naturally occurring clays, e.g., bentonite and kaolin, to improve the crush strength of the catalyst under commercial operating conditions and function as binders or matrices for the catalyst.

In an embodiment, the present invention typically comprises, in a composited form, a ratio of support material to binder material ranging from about 80 parts support material to 20 parts binder material to 20 parts support material to 80 parts binder material, all ratios being by weight, typically from 80:20 to 50:50 support material:binder material, preferably from 65:35 to 35:65. Compositing may be done by conventional means including mulling the materials together followed by extrusion of pelletizing into the desired finished catalyst particles.

As stated above, the present invention further comprises a hydrogenation-dehydrogenation component selected from Group VIII metals and mixtures thereof. It is preferred that the hydrogenation-dehydrogenation component be selected from palladium, platinum, rhodium, iridium, and mixtures thereof, more preferably platinum, palladium, and mixtures thereof. It is most preferred that the hydrogenation-dehydrogenation component be a mixture of platinum and palladium.

In an embodiment, the hydrogenation-dehydrogenation component is typically present in an amount ranging from about 0.1 to about 2.0 wt. %, preferably from about 0.2 to about 1.8 wt. %, more preferably 0.3 to about 1.6 wt. %, and most preferably 0.4 to about 1.4 wt. %. All metals weight percents are on support. By "on support" we mean that the percents are based on the weight of the support, i.e. the composited support material and binder material. For example, if the support were to weigh 100 g. then 20 wt. % hydrogenation-dehydrogenation component would mean that 20 g. of the hydrogenation-dehydrogenation metal was on the support.

In a preferred embodiment the catalyst will contain both Pt and Pd which, in a still more preferred embodiment will be in a weight ratio of about 1:2 to about 1:4. In a still more preferred embodiment, the catalyst will contain about 0.3±0.1 wt. % Pt (more preferably ±0.05) and about 0.9±0.1 wt. % Pd (more preferably ±0.05) on MCM-41 with the atomic ratio of Pt/Pd in the range of about 1:6.5 to about 1:7. In another more preferred embodiment, the catalyst comprises a mesoporous MCM-41 having a binder comprising alumina and comprising about 0.10-0.25 wt. % Pt and about 0.30-0.75 wt. % Pd. In an embodiment, which may be combined with the more preferred embodiments described in this paragraph, the overall ratio of silica to alumina in the catalyst, including binder (if present) will be about 35 wt. % alumina and about 65 wt. % silica.

The hydrogenation-dehydrogenation component can be exchanged onto the support material, impregnated into it or physically admixed with it. It is preferred that the hydrogenation/dehydrogenation component be incorporated by impregnation. If the hydrogenation-dehydrogenation component is to be impregnated into or exchanged onto the composited support material and binder, it may be done, for example, by treating the composite with a suitable ion containing the hydrogenation-dehydrogenation component. If the hydrogenation-dehydrogenation component is platinum, suitable platinum compounds include chloroplatinic acid, platinous chloride and various compounds containing the platinum amine complex.

The hydrogenation-dehydrogenation component may also be incorporated into, onto, or with the composited support and binder material by utilizing a compound(s) wherein the hydrogenation-dehydrogenation component is present in the cation of the compound and/or compounds or in which it is present in the anion of the compound(s). It should be noted that both cationic and anionic compounds can be used. Non-limiting examples of suitable palladium or platinum compounds in which the metal is in the form of a cation or cationic complex are $Pd(NH_3)_4Cl_2$ or $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

The feedstocks are feed into an apparatus comprising a reaction stage comprising the catalyst according to the present invention. In an embodiment, the catalyst, described above, contacts the feedstream in a fixed bed reactor in the presence of hydrogen treat gas under effective aromatics saturation conditions. While such effective conditions may be determined by one of ordinary skill in the art in possession of the present disclosure without more than routine experimentation, typical hydrogen partial pressures may be about 1000 psig or less, in an embodiment less than 900 psig, in another embodiment less than 800 psig, in another embodiment less than 750 psig, in another embodiment less than 600 psig, in another embodiment less than 500 psig, in another embodiment less than 400 psig, in another embodiment less than 300 psig, with preferred conditions being a hydrogen partial pressure of about 300-700 psig with treat ratios of about 500-2000 scf/bbl feed (about 87-348 cc $H_2$/cc feed based on 5.74 scf/bbl per cc $H_2$/cc feed) more preferably about 1100-1300 scf/bbl feed, a temperature of from about 150° C. to about 300° C., or about 160° C. to about 250° C., or about 170° C. to about less than 232° C., or about 175° C. to about 225° C., or about 180° C. to about 220° C. (it being recognized that additional suitable temperature ranges include any of the aforementioned lower values to any of the aforementioned upper values, e.g., about 150° C. to about 225° C., or 170° C. to about less than 232° C., and so forth), space velocity of about 0.5 to 5.0 $hr^{-1}$, more preferably 1.5 to 3.0 $hr^{-1}$. Treat ratios given in SCF/Bbl above consumption. Typically, using a feed comprising 1 wt. % aromatics, consumption is on the order of 25 scf/bbl feed; using a feed comprising 20 wt. % consumption is on the order of 500 scf/bbl feed. Again, while conditions may be determined by one of ordinary skill in the art in possession of the present disclosure, one of the great advantages of the present invention is that the aromatics content may be reduced to very low levels at effective aromatics saturation conditions which include low temperatures, such as below about 232° C.

The catalyst according to the invention will typically contact the feedstream in a fixed bed reactor. However, other known methods of contacting a feedstream with a supported catalyst may also be used, such as by contacting the feedstream with the catalyst in a column, i.e., reactive or catalytic distillation. As previously mentioned, multiple reactors are also contemplated, e.g., a first reactor having a first hydrogenation catalyst and a second reactor having a Group VIII catalyst supported on MCM-41 according to the present invention.

Hydrocarbon fluids produced by the method according to the invention may be characterized by aromatics content of less than 500 ppm, in an embodiment less than 100 ppm, in another embodiment less than 50 ppm, and in another embodiment less than 10 ppm. Aromatics may be determined by various techniques as would be readily apparent to one of ordinary skill in the art in possession of the present disclosure. Generally available commercial UV spectrometers can detect aromatics down to a level of about 10 ppm. Generally available commercial GC-mass spectrometers can detect aromatics down to a level of about 0.4 ppm. The method of oxygenate determination used herein is set forth after the experimental section and may also be determined by one of ordinary skill in the art in possession of the present disclosure.

In an embodiment, the sulfur content of the product will be less than 100 ppm, in another embodiment less than 10 ppm, and in another embodiment less than 1 ppm. In a preferred embodiment sulfur cannot be detected in the product according to the ASTM methods specified herein.

In an embodiment, the content of oxygenates will be less than 10 ppm, preferably less than 5 ppm, more preferably less than 1 ppm, and still more preferably there are no detectable oxygenates by UV-vis detection methods.

The hydrocarbon fluids produced by the present invention are useful in consumer products such as paints (e.g., comprising resins, pigments, dyes, and the like), cleaning products, industrial processes requiring ultra high purity solvents such as the semiconductor industry, and processes requiring high levels of purity such as water treatment processes, solvent extraction (e.g., in soybean processing), metal rolling, and ore extraction, or in compositions such drilling fluid formulations, agricultural formulations (e.g., comprising pesticides, insecticides, fertilizers, and the like), and miscellaneous compositions such as those comprising silicone sealants.

In certain end uses, such as metal working and aluminum rolling, it is important that the hydrocarbon fluid compositions meets regulatory requirements on aromatic levels, e.g., FDA regulations in the United States. In other end uses hydrocarbon fluids are used as solvents or reagent carriers in reactive media that require high chemical stability during use. Examples of such applications are polymerization reactions, where solvents are used as dispersing media or as catalysts (f.ex. peroxide carriers). In yet other end uses, such as in drilling mud oil formulations or ore extraction formulations, it is important that the hydrocarbon fluids have low environmental impact, particularly aquatic toxicity. In still other applications, such as in coatings or silicon sealant formulations, it is highly desirable to use hydrocarbon fluids having high color and odor stability over extended periods of time, sometimes under extreme wear conditions. The present invention provides for cuts or grades of hydrocarbon fluids meeting one or more of the aforementioned requirements.

EXAMPLES

The following examples are meant to illustrate the present invention. Numerous modifications and variations are possible and it is to be understood that within the scope of the appended claims, the invention may be practiced otherwise than as specifically described herein.

Examples 1-4 and Comparative Example

A preferred aromatic saturation catalyst is used in the following examples, and consists of a support containing 65 wt % MCM-41, with a pore diameter of about 40 angstroms, and 35 wt % alumina binder. The support is coated with 0.9 wt % palladium and 0.3 wt % platinum, as described below. Further improvements are seen by incorporating aluminum into the MCM-41 structure, reducing the pore diameter of the MCM-41 component, and reducing the amount of precious metal loadings, as shown in Table 1 below.

A series of catalysts were made using MCM-41, having the $SiO_2:Al_2O_3$, pore openings, and other characteristics listed in Table 1. MCM-41 mesoporous materials were synthesized and then decanted and prepared into a filter cake. The filter cake was washed with DI (deionized) water and then precalcined in nitrogen at about 540° C. The precalcined MCM-41 materials were then mixed with a Versal-300 alumina binder and extruded into $1/16''$ cylinders. The extrudates were dried and then calcined in air at about 538° C. The calcined extrudates were then co-impregnated with solutions containing platinum and palladium salts and dried at 120° C. The catalysts then received a final calcination in air at 304° C. to decompose the platinum and palladium compounds. The Pt and Pd loadings specified in Table 1 are on a metals basis, after calcinations, percentages based on the entire composition.

For comparison, an amorphous catalyst was made by extruding 80 wt. % alumina (Versal® 300 alumina) and 20 wt. % (Ultrasil® silica) into $1/16''$ cylinders. The extrudates were dried and then calcined in air at about 538° C. The calcined extrudates were then co-impregnated with platinum and palladium salts and dried at 120° C. The catalysts then received a final calcination in air at 304° C. to decompose the platinum and palladium compounds, to provide the metal loading indicated in the table, after calcination.

Properties of the finished catalysts are summarized below in Table 1. Note that metal dispersion, as measured by oxygen chemisorption, is similar for all the finished catalyst but the benzene hydrogenation activity (BHA) index increases with reduction in the diameter of the MCM-41 pore openings. The BHA test is detailed further below.

TABLE 1

| Description | Pt, wt % | Pd, wt % | Surface Area, $m^2/g$ | Benzene Hydrogenation Activity Index | $O_2$ Chemisorption, O/M |
|---|---|---|---|---|---|
| 65/35 MCM-41 (800:1 $SiO_2:Al_2O_3$ 40 angstroms)/$Al_2O_3$ | 0.28 | 0.88 | 575 | 170 | 0.65 |
| 65/35 MCM-41 (50:1 $SiO_2:Al_2O_3$ 40 angstroms)/$Al_2O_3$ | 0.27 | 0.89 | 490 | 190 | 0.64 |
| 65/35 MCM-41 (50:1 $SiO_2:Al_2O_3$ 40 angstroms)/$Al_2O_3$ | 0.14 | 0.43 | 450 | 200 | 0.63 |
| 65/35 MCM-41 (25:1 $SiO_2:Al_2O_3$ 25 angstroms)/$Al_2O_3$ | 0.29 | 0.87 | 711 | 230 | 0.68 |
| 80/20 $SiO_2:Al_2O_3$ | 0.27 | 0.91 | 307 | 40 | 0.50 |

Following catalyst preparation, the performance of each catalyst was evaluated for finishing a hydrocarbon feedstock principally comprising C16 to C19 hydrocarbon fluids representing an actual cut of from 282° C. to 310° C. (540-590° F.), containing less than 5 ppm sulfur and nitrogen, and about 1.8 wt % aromatics, by hydrogenation.

Approximately 20 cc of each catalyst was loaded into an upflow micro-reactor. About 15 cc of 80-120 mesh sand was added to the catalyst to ensure uniform liquid flow. After pressure testing with nitrogen and hydrogen, the catalysts were dried in nitrogen at 260° C. for about 3 hours, cooled to room temperature, activated in hydrogen at 100 psia at about 260° C. for 8 hours and then cooled under the same hydrogen atmosphere to 150° C.

The feedstock comprising the hydrocarbon fluid was introduced and operating conditions were adjusted to 1 LHSV (liquid hourly space velocity of 1 $hr^{-1}$), 350 psig, and 1,000 scf $H_2$/bbl. Reactor temperature was increased from 175 to 220° C. over a period of about 10 days. Hydrogen purity was 100% and no gas recycle was used.

Figure 2:
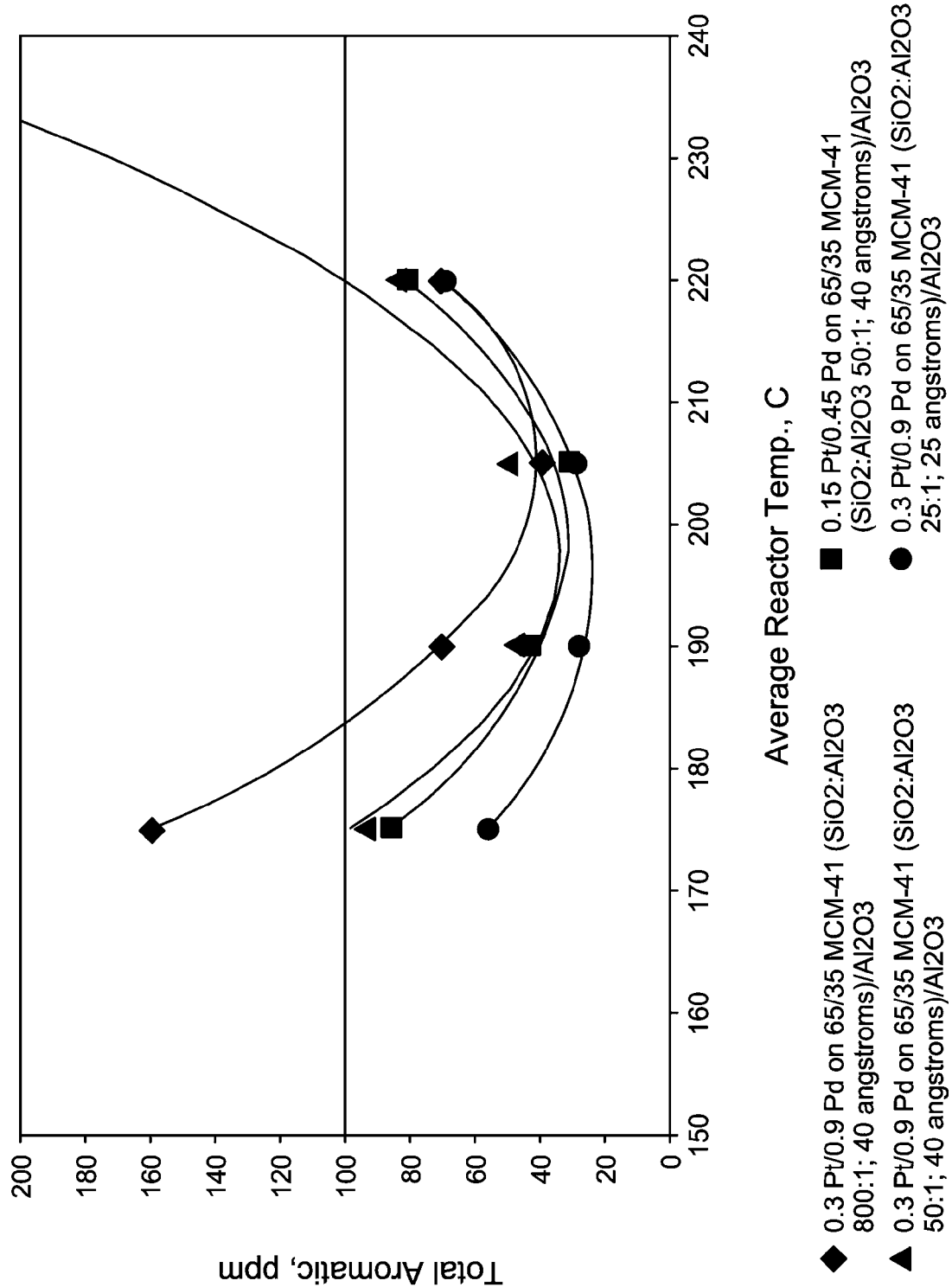
FIG. 2 illustrates an enlarged portion of FIG. 1, showing in detail an embodiment of the present invention.

Aromatics, measured by UV absorption (ppm), was monitored daily. Total aromatics as a function of temperature are shown in FIG. 1 for the amorphous silica-alumina catalyst and catalysts made using the different MCM-41 materials. FIG. 2 shows the results for MCM-41 materials in greater detail. As shown, catalysts made using MCM-41 showed better aromatic saturation activity and MCM-41 materials containing higher amounts of aluminum and having smaller diameter pore openings provided the highest level of aromatic saturation. The catalyst loaded with 0.57 wt. % metals has essentially the same aromatic saturation activity as the catalyst loaded with 1.16 wt. % metals, which is a surprising result.

Example 5

A preferred aromatic saturation catalyst is used in the following examples, and consists of a support containing 65 wt % MCM-41, with a pore diameter of about 40 angstroms, and 35 wt % alumina binder. The support is coated with 0.9 wt % palladium and 0.3 wt % platinum as previously described. Three aliphatic fluids comprising C12-C15 hydrocarbons representing a distillation cut of from 455-515° F. were tested. Feed A was commercially produced by first hydrotreating over a conventional CoMo catalyst and then fractionated to the desired actual cut of 460-506° F. (238-263° C.) resulting in a feed with about 2 ppm sulfur and 25 wt. % aromatics. Feed B was commercially produced by processing Feed A over a conventional NiMo catalyst resulting a in feed having around 1 ppm sulfur and 20 wt % aromatics. Feed C was produced in a pilot plant by processing Feed A over a conventional Nickel catalyst resulting in a feed having no detectable sulfur and about 10 wt % aromatics. These feeds were then processed over the preferred catalyst at 23 bar total pressure using pure $H_2$. The results are illustrated in FIG. 3.

Figure 3:
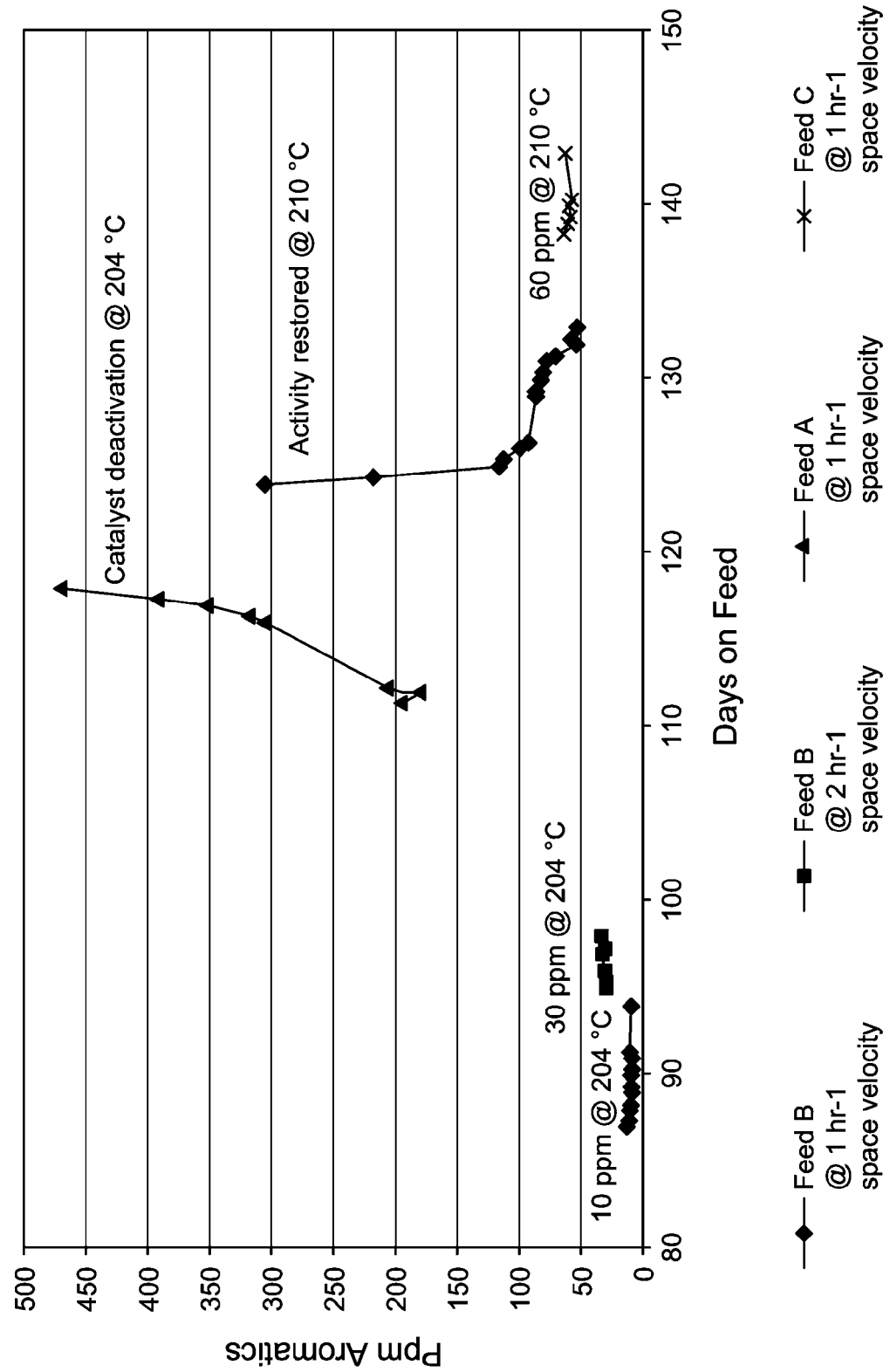
FIGS. 3 and 4 illustrate dearomatization of various hydrocarbon fluid feeds according to embodiments of the invention.

FIG. 3 illustrates the ability to produce and sustain ultralow aromatic hydrocarbon fluid products using Feeds B and C over catalyst that has been aged by processing other stocks. Feed B provided a product with 10 ppm aromatics when processing at 1 hr−1 space velocity with only a modest increase in aromatics to 30 ppm when doubling the space velocity. Although Feed A resulted in a marked decline in catalyst activity, significant activity was restored by processing with Feed B enabling continued production of ultra low aromatics product. The experiments demonstrates that temporary deactivation caused by Feed A is removed either by processing feed over NiMo or Nickel.

Example 6

Feed D, a fluid principally comprising C16-C19 hydrocarbons, having an actual cut of from 540-590° F. and further comprising 2 wt. % aromatics was processed over the catalyst described in Example 5.

Figure 4:
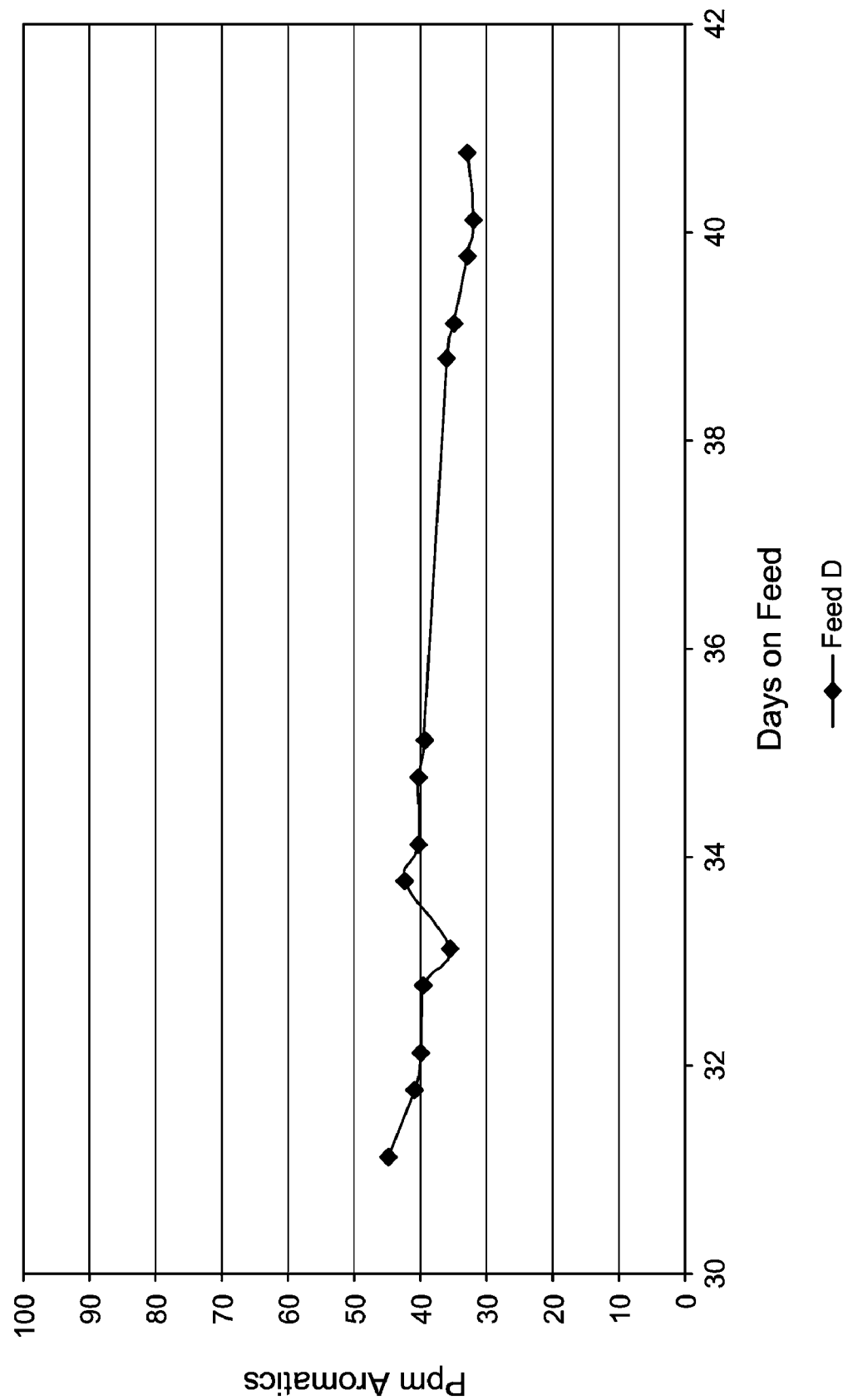

FIG. 4 shows the ability to recover activity and produce a heavy boiling solvent containing less than 50 ppm aromatics.

Example 7

Feed E, a fluid principally comprising C13-C15 hydrocarbons, having an actual cut of from 480-510° F. and further comprising 0.4 wt. % aromatics was processed over the catalyst described in Example 5. Dibenzothiophene was added to this feed to evaluate the effects of sulfur in the feedstream on the ability to produce ultra low aromatics hydrocarbon fluid product.

As shown in Table 2, ultra low aromatics capability with no detectable levels of sulfur present (ASTM D-5453) in the product being maintained even with sulfur present in the feed (amount shown in Table 2 as "Feed S"). 0.1 ppm S is the limit of detectability testing according to ASTM D-5453.

TABLE 2

| Feed S (ppm) | Pressure (psig) | Temp (° F.) | Aromatics (ppm) | Prod S (ppm) |
| --- | --- | --- | --- | --- |
| 0 | 348 | 390 | 9 | NA |
| 1.0 | 349 | 390 | 12 | <0.1 |
| 2.1 | 349 | 390 | 19 | <0.1 |
| 2.9 | 349 | 391 | 31 | <0.1 |
| 3.9 | 353 | 387 | 44 | <0.1 |
| 4.7 | 349 | 385 | 56 | <0.1 |

Example 8

A comparative test of the preferred catalyst and conventional Nickel was conducted to evaluate oxygenate removal using a predominately C6 isomer feed having an actual cut of 150-156° F. (about 65-69° C.) and further containing about 20 ppm oxygenates. Pilot plant runs were conducted with each catalyst at a 1.7 hr−1 LHSV, a temperature of 266° F. (about 130° C.), and 335 psig total pressure using approximately 1000 scf/bbl pure hydrogen. Oxygenate content of the product produced using Nickel catalyst was equivalent to that of the feed while that produced over the preferred catalyst was not detectable.

Benzene Hydrogenation Activity Index reported herein are determined in the following manner. Active metals on supports are screened for hydrogenation activity in the Benzene Hydrogenation Activity (BHA) test. Catalyst samples (ca. 0.2 grams) are first dried in helium for one hour at 100° C., then reduced at a selected temperature (120-350° C., nominally 250° C.) for one hour in flowing hydrogen. The catalyst is cooled to 50° C. in hydrogen, and the rate of benzene hydrogenation is measure at 50, 75, 100, and 125° C. The hydrogen is flowed at 200 sccm and passed through a benzene sparger held at 10° C. The data are fit to a zero-order Arrhenius plot, and the rate constant in moles of product per mole of metal per hour at 100° C. is reported. The pressure is atmospheric.

Trace oxygenates were determined in the following manner. The oxygenates in each sample were identified with a mass selective detector (MSD) and quantitated with a flame ionization detector (FID). Quantitation of the oxygenates present in these samples were based on a 10 ppm C6 Alcohol (2-methyl-cyclopentanol) standard using the FID detector. The lower detection limit for this method is 1 ppm. The following are the instrument parameters used for this analysis.

GC#25, HP6890—Identification of Oxygenates

Columns: HP-5 (30 m×0.32 mm ID, 0.25 μm df); LowOx (10 m, 0.53 mm ID, 0.10 μm df)

Injector: 250° C., Split 5:1, He carrier, Total flow at 49.1 ml/minute, 22.0 psi Head Pressure at 35° C., 2.0 μL sample injection.

FID Detector: 250° C., 40 cc/min hydrogen, 450 cc/min air; Range 0

MSD: SIM Mode, Source Temp. 230 C, Quad Temp 150 C.

Oven: Initial temperature of 40° C. held for 4 minutes; temperature increased at 20° C./min from 40° C. to 200° C. Temperature increased at 5° C./min to 300° C. and held for 15 min.

The aromatic content reported herein were calculated from the baseline absorbance of the peak produced by the sample in the 260 to 280-nm region in a UV spectrophotometer. Absorption coefficients are calibrated by means of aromatic fractions separated by silica gel percolation from stocks that are typical of the sample. They may also be estimated from mixtures of known aromatic compounds that provide similar UV absorption spectra. The accuracy of the test method using a single silica gel calibration is estimated to be within about 10% of the reported aromatic concentration. This estimate is based on two calibrations of the same sample that differed by 10%, and it does not account for variations among different manufacturing batches. The limit of detectability by this method is about 10 ppm. Commercially available GC-mass spectrometers are capable of a detection limit for aromatics as low as about 0.4 ppm.

Boiling points and ranges specified herein were determined according to ASTM D-86 or ASTM D-1078, depending on the characteristics of the hydrocarbon fluid. One of ordinary skill in the art can determine the appropriate ASTM method.

When a composition is described as "principally comprising" a specified species, it is meant that no other species is present in amounts equal to or greater than that specified. In the case where more than one species is specified (e.g., "principally comprising C16, C17, and C18") those specified are present in amounts greater than any species not specified.

It will be recognized by one of ordinary skill in the art in possession of the present invention that the various embodiments set forth herein, including preferred and more preferred embodiments, may be combined in a manner consistent with achieving the objectives of the present invention. Thus by way of example, an embodiment of the present invention includes a method of dearomatizing hydrocarbon fluids wherein the feedstream and product have essentially the same boiling range and wherein the hydrocarbon fluid is not isomerized by the process, and wherein the product has less than 100 ppm aromatics.

Many other variations will suggest themselves to one of ordinary skill in the art in possession of the present disclosure. Preferred embodiments include: (I) a process for hydrogenating a hydrocarbon fluid feedstream comprising aromatic molecules, the process comprising contacting said hydrocarbon feedstream boiling below 350° C., preferably below 330° C., more preferably below 315° C., and comprising C5-C25 hydrocarbon fluids, preferably C5-C19 hydrocarbon fluids, in the presence of a hydrogen-containing treat gas in a reaction stage operated under effective aromatics saturation conditions (particularly wherein said conditions include a temperature of less than about 232° C., preferably in the range of about 150° C. to about less than 232° C. or one of the ranges listed in paragraph [0091], above), wherein said aromatics saturation catalyst comprises a hydrogenation-dehydrogenation component selected from the Group VIII noble metals and mixtures thereof, supported on an inorganic, porous, non-layered, crystalline, mesoporous support material, wherein the support material has a framework comprising at least aluminum and silica, and wherein the ratio of silica to aluminum is about 10:1 to about 100:1 and the average pore diameter of the support material is about 15 to less than about 100 Å, and recovering a distillation fraction product comprising a hydrocarbon fluid having a boiling range of at least 5° C., and comprising less than 100 ppm aromatics; which may be further characterized by one or more of the following limitations: wherein the boiling range of said product is the same as the boiling range of said feedstream; wherein said product has not been isomerized from said feedstream; wherein said product has no detectable species attributable to isomerization or cracking from the contact with said hydrogenation-dehydrogenation component; wherein said feed has an aromatic content of at least 500 ppm, preferably an aromatic content of between about 1 wt. % and 20 wt. %; wherein said product has an aromatic content of less than 500 ppm, preferably 100 ppm, more preferably less than 50 ppm, still more preferably less than 20 ppm, yet again more preferably less than 10 ppm; wherein said product comprises less than 10 ppm oxygenates, preferably less than 5 ppm, more preferably less than 1 ppm, and still more preferably no detectable levels of oxygenates by FID; wherein said product comprises no detectable levels of sulfur by ASTM D-5453; wherein said product has a distillation cut of from about 60-150° C. and having from 5 to 10 carbon atoms, preferably 6-8 carbon atoms; wherein said product has a distillation cut of from about 150-315° C., preferably 180-350° C., a boiling range of from about 5° C. to about 40° C., and having from 9 to 19 carbon atoms, preferably 10 to 19 carbon atoms; wherein said process further comprising a step of hydrotreating and/or hydrofining a first feedstream selected from ACN (Atmospheric Crude Naptha), HVN (Heavy Virgin Naptha), kerosene, diesel, LGO (Light Gas Oils), PGO (Process Gas Oils), oligomers produced in a chemical process, a feedstream derived from a GTL process, and mixtures thereof, to obtain a second feedstream comprising C5-C19 hydrocarbon fluids having a boiling range of at least 5° C. and having an aromatics content of at least 500 ppm, and then contacting said second feedstream with said aromatics saturation catalyst in the presence of a hydrogen-containing treat gas in a reaction stage operated under effective aromatics saturation conditions, and recovering a distillation fraction comprising a hydrocarbon fluid having a boiling range of at least 5° C., and comprising less than 100 ppm aromatics; wherein said effective aromatics saturation conditions include a hydrogen partial pressure of less than 1000 psig, optionally less than 800 psig, optionally less than 700 psig, optionally less than 650 psig, optionally less than 600 psig, optionally less than 500 psig, optionally less than 400 psig, optionally about 300 psig or less; and also (II) the use of a C5-C25 hydrocarbon fluid having a boiling range of at least 5° C. made by a process according to a process of the invention, said process selected from the manufacture of semiconductors, water treatment, solvent extraction, ore extraction, metal rolling, or as a processing aid in polyolefin manufacture, in a drilling fluid formulation, in a printing ink, in an agricultural formulation, or in compositions comprising a silicone sealant, colorant, or a combination thereof; for example in the following uses: in a paint composition comprising a resin, a colorant, and said said hydrocarbon fluid; in a solvent extraction process comprising contact soybeans with said hydrocarbon fluid; in a agricultural formulation comprising said hydrocarbon fluid and at least one material selected from pesticides, plant growth regulators, and mixtures thereof; and also (III) a catalyst comprising an inorganic, porous, non-layered, crystalline, mesoporous MCM-41 having about 0.10-0.25 wt. % Pt and about 0.30-0.75 wt. % Pd incorporated therein, said mesoporous MCM-41 characterized by a framework comprising at least aluminum and silica, and wherein the ratio of silica to aluminum is about 10:1 to about 100:1 and having an average pore diameter of about 15 to less than about 100 Å; or the catalyst further characterized by: further comprising an alumina-silica binder; wherein said MCM-41 has a silica to alumina ratio of about 100:1 to about 10:1, preferably about 60:1 to about 20:1, and more preferably about 40:1 to about 20:1; wherein said framework has an average pore diameter of about 15 to about 50 Å, preferably about 20 to about 40 Å; and also (IV) compositions described herein, particularly compositions made by or obtainable by the process according to the invention, particularly: in a C9-C25 hydrocarbon fluid made by a process according to the invention, which in an embodiment may be characterized wherein the improvement comprises said hydrocarbon fluid having less than 100 ppm aromatics, less than 10 ppm sulfur according to ASTM D-5453, and less than 1 ppm oxygenates by FID, and even more particularly wherein said fluid has a boiling range of from about 5° C. to about 50° C., and a distillation cut and aromatics content, respectively, selected from the group consisting of (a) 157-207° C. and less than 100 ppm aromatics; (b) 196-235° C. and less than 100 ppm aromatics; (c) 238-263° C. and less than 100 ppm aromatics; and (d) 282-311° C. and less than 300 ppm aromatics, and/or characterized as having no detectable sulfur by ASTM D-5453 and no detectable oxygenates using flame ionization detection (FID); and also compositions characterized as a hydrocarbon fluid principally comprising C6 (hexanes), made by a process according to the invention, which may further be characterized by having an aromatics content of less than 1 ppm according to UV spectroscopy, no detectable levels of sulfur according to ASTM D-5453, and no oxygenates detectable by FID, and also as a hydrocarbon fluid principally comprising C7 (heptanes), made by a process according to the invention, further characterized by having less than 1 ppm aromatics, as determined by UV spectroscopy, no detectable levels of sulfur according to ASTM D-5453 and no oxygenates detectable by FID.

Trade names used herein are indicated by a ™ symbol or ® symbol, indicating that the names may be protected by certain trademark rights, e.g., they may be registered trademarks in various jurisdictions. All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process comprising a step of hydrotreating and/or hydrofining a first feedstream selected from ACN (Atmospheric Crude Naptha), HVN (Heavy Virgin Naptha), kerosene, diesel, LGO (Light Gas Oils), PGO (Process Gas Oils), oligomers produced in a chemical process, a feedstream derived from a GTL process, and mixtures thereof, to obtain a second feedstream comprising C5-C19 hydrocarbon fluids having a boiling range of at least 5° C. and having an aromatics content of at least 500 ppm, contacting said second feedstream with an aromatics saturation catalyst in the presence of a hydrogen-containing treat gas under aromatics saturation conditions effective to produce a distillation fraction product comprising a hydrocarbon fluid having a boiling range of at least 5° C. and comprising less than 100 ppm aromatics, said aromatic saturation conditions including a temperature of about 175 to about 225° C. and a hydrogen partial pressure of less than 1,000 psig, and wherein said aromatics saturation catalyst comprises a hydrogenation-dehydrogenation component comprising Pt and Pd in a weight ratio of 1:2 to 1:4 on a support material comprising MCM-41 and a binder material comprising alumina in a ratio of support material to binder material of from 80:20 to 50:50, and wherein the pore size of the calcined crystalline support is from 15 to 40 Å, and recovering a distillation fraction product.

2. The process according to claim 1, wherein said distillation fraction product is a hydrocarbon fluid principally comprising hexanes, further characterized by having an aromatics content of less than 1 ppm according to UV spectroscopy, no detectable levels of sulfur according to ASTM D-5453, and no oxygenates detectable by FID.

3. The process according to claim 1, wherein said distillation fraction product is a hydrocarbon fluid principally comprising heptanes, further characterized by having no detectable levels of sulfur according to ASTM D-5453 and no oxygenates detectable by FID.

4. The process of claim 1, wherein the boiling range of said product is the same as the boiling range of said feedstream.

5. The process of claim 1, wherein said product has not been isomerized from said feedstream.

6. The process of claim 1, wherein said product has no detectable species attributable to isomerization or cracking from the contact with said hydrogenation-dehydrogenation component.

7. The process of claim 1, wherein said product has an aromatic content of less than about 10 ppm.

8. The process of claim 1, wherein said product comprises less than 10 ppm oxygenates.

9. The process of claim 1, wherein said product comprises less than 5 ppm oxygenates.

10. The process of claim 1, wherein said product has no detectable levels of oxygenates by FID.

11. The process of claim 1, wherein said product comprises no detectable levels of sulfur by ASTM D-5453.

12. The process of claim 1, wherein said product is a distillation cut of from about 60-150° C. and having from 5 to 10 carbon atoms.

13. The process of claim 12, wherein said product has from 6 to 8 carbon atoms.

14. The process of claim 1, wherein said product is a distillation cut of from about 150-315° C., a boiling range of from about 5° C. to about 40° C., and having from 9 to 19 carbon atoms.

15. The process of claim 1, wherein said effective aromatics saturation conditions include a hydrogen partial pressure of about 300 to about 1000 psig.

16. The process of claim 1, wherein said aromatic saturation conditions including a temperature of from 180° C. to 220° C.

17. The process of claim 1, wherein said catalyst includes a binder comprising Al.

18. The process of claim 1, including a step of hydrotreating and/or hydrofining said first feedstream by contact with NiMo or Ni so as to produce said second feedstream, said second feedstream further characterized by a sulfur content of 1 ppm or less.

19. The process of claim 1, wherein the overall ratio of silica to alumina in the catalyst, including binder if present, is about 65:35 by weight.

* * * * *